UNITED STATES PATENT OFFICE.

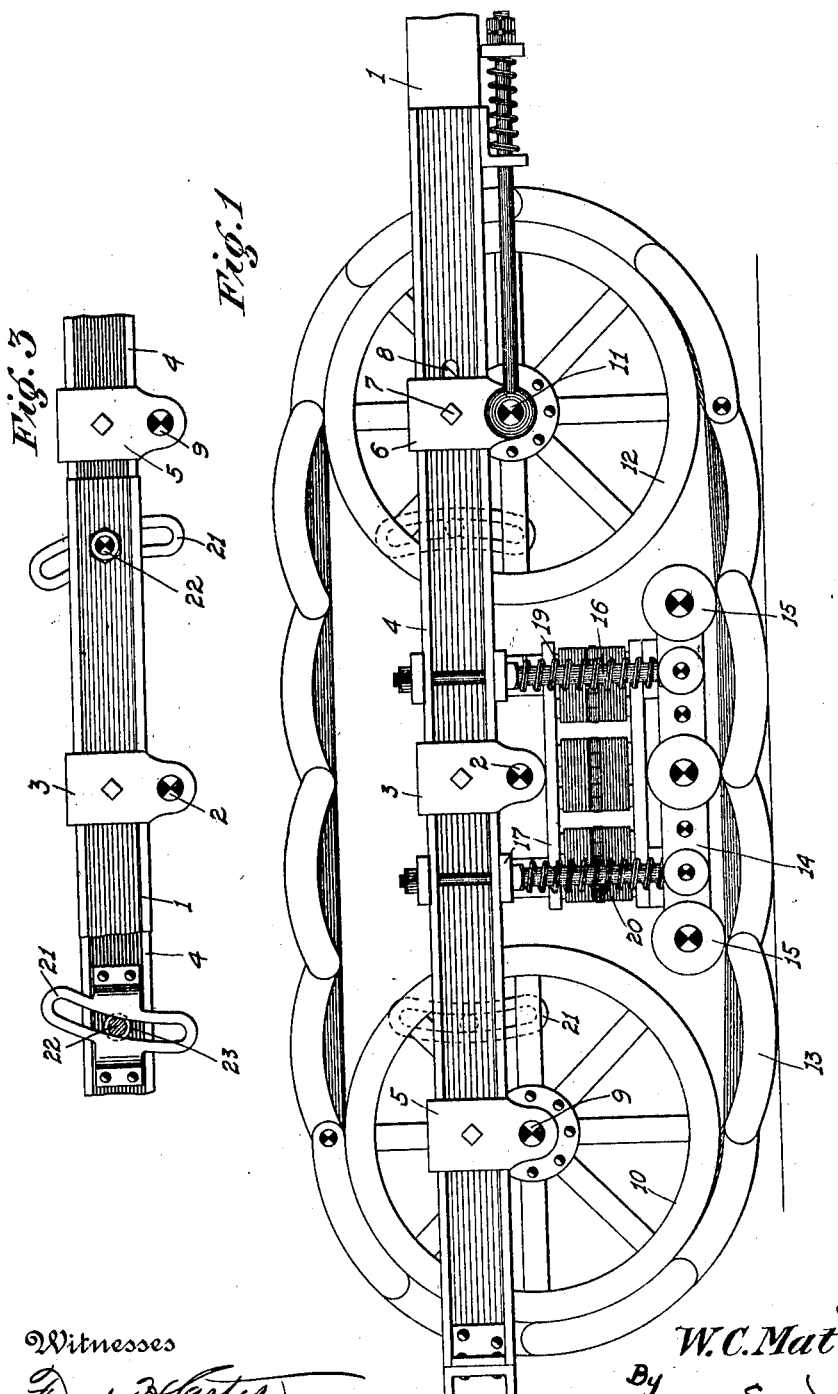

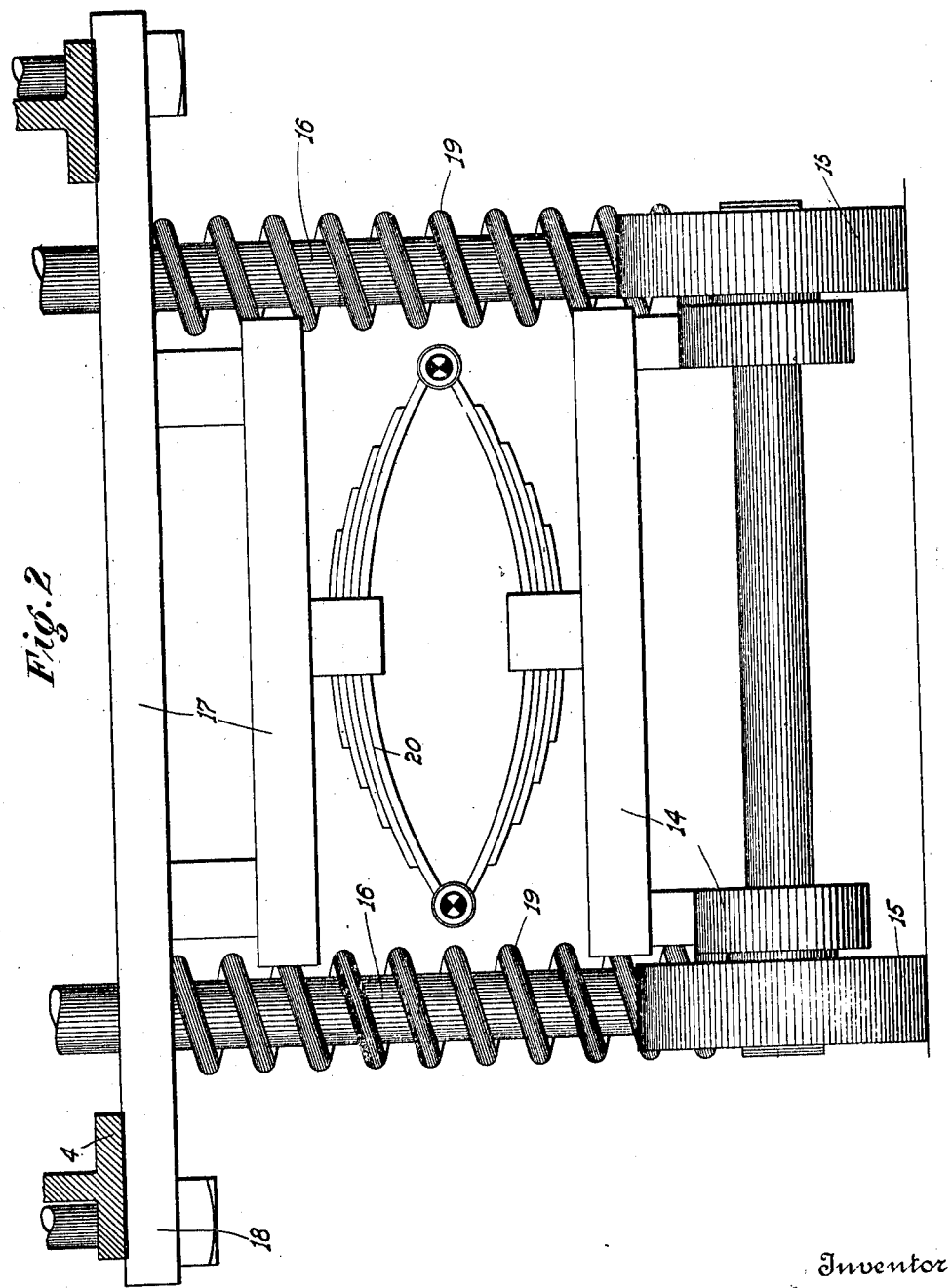

WALTER C. MATTESON, OF SAN JOSE, CALIFORNIA.

MEANS FOR MOUNTING TRUCK MEMBERS ON ENDLESS-BAND WHEELS.

1,020,105.  Specification of Letters Patent.  Patented Mar. 12, 1912.

Original application filed March 23, 1910, Serial No. 551,093. Divided and this application filed August 30, 1911. Serial No. 646,930.

*To all whom it may concern:*

Be it known that I, WALTER C. MATTESON, a citizen of the United States, residing at San Jose, in the county of Santa Clara, State of California, have invented certain new and useful Improvements in Means for Mounting Truck Members on Flexible-Band Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in wheels used for all purposes, the object of the invention being to produce a simple and inexpensive flexible wheel truck, the same being substantially elongated in shape and having a flexible endless band to present a long, flat tread to the ground surface, such truck having a center hub and spaced outer operating wheels over which the band is operated, one of which wheels is driven by the power from the vehicle to which the truck is attached, the entire band wheel truck being flexible to conform to all unevenness of surface and being also flexibly secured to the vehicle to which it is attached to permit said vehicle to at all times remain in substantially an even plane regardless of what rough and uneven surfaces the band wheel truck passes over.

A further object of the invention and the main structure hereinafter described and claimed is means for mounting the truck on which the flexible band is mounted, this means including an auxiliary truck having a supporting frame and rollers which bear against the under surface of the flexible band wheel, such auxiliary truck and rollers having resilient springs so arranged as to sustain the load and at the same time keep the tread of the flexible band below the plane of the operating wheels over which they move. The main features of the band wheel truck itself are set forth and claimed in the application for patent made by me March 23rd, 1910, Serial No. 551,093 in which the subject matter of this application was originally claimed, but which is hereby divided from said application, and made a part of this case. Reference is made to said original application for greater certainty.

The objects above set forth are accomplished by means of such structure and relative arrangement of parts as will fully appear by a perusal of the following specification and claims.

In the drawings similar characters of reference indicate corresponding parts in the several views.

Figure 1 is a side elevation of the flexible band wheel truck complete showing my improved mounting means and supporting means thereon. Fig. 2 is an end elevation of the supporting auxiliary truck. Fig. 3 is a detached view partly broken out showing guide yokes.

Referring now more particularly to the characters of reference on the drawings, 1 designates the main frame of the vehicle to which my improved band wheel truck is attached, which vehicle may be power driven as a traction engine or any other vehicle such as a hauling truck, wagon, or similar vehicles. On said truck 1 is suitably secured a shaft or axle 2 mounted on which is a journal box or hub 3 of my improved flexible band truck, which hub carries an elongated or substantially oblong frame 4 carrying journal boxes 5 at its rear end and journal boxes 6 at its forward end, such boxes 6 having rods 7 movable in elongated slots 8 in said frame 4. In the boxes 5 is journaled a shaft 9 on which are secured spaced wheels 10 of any desired structure. The shaft 9 is rotated by power from the vehicle by means of any suitable gear or sprocket structure.

In the boxes 6 is journaled a shaft 11 carrying two spaced wheels 12 alined with the wheels 10 and being of similar structure to said wheels 10. Mounted on the wheels 10 and 12 is a flexible band 13 of any suitable desired structure but more particularly of a structure such as is shown in said application, Serial No. 551,093 heretofore referred to. This band wheel has also supporting means and other structure to operate therewith shown in the drawings herewith presented but not described, which structure is also shown, described and claimed in said application Serial No. 551,093.

When the device is used the wheels 10 and 12 remain normally above the plane of the ground surface as shown in Fig. 1, the said wheels 10 and 12 merely acting as operating wheels to cause said band to travel, the weight of the load being carried by an auxiliary truck comprising a base frame 14 having rollers 15 bearing against the flat under surface of the band, said base frame 14 having vertical rods 16 movable through cross frames 17 bolted or otherwise fastened to the frame 4 as at 18, or othewise fastened to said frame 4 on each side of the center hub 3. There are spiral springs 19 disposed around the rods 16 and interposed between the frame 14 and the frame 17 and there is also a nest of elliptical springs 20 disposed between the frames 14 and 17. These springs 19 and 20 sustain the load of the vehicle as will readily appear, and keep the tread of the band below the plane of the wheels 10 and 12, as above described. By means of the central shaft 2 and hub 3 the truck 4 is flexibly disposed with relation to the main frame 1 and the body of the vehicle by reason of the pivotal connection with said body by the said shaft 2. If desired the said truck 4 may be left freely turnable on said shaft 2 so that it may turn around completely on said shaft 2 in an unlimited manner, but if desired to guide the same to a limited extent I have provided slotted yokes 21 secured to said frame 4 in which bearing pins or bolts 22 mounted through the frame 1 may be projected, such pins 22 having flanges 23 holding them in place in said slotted yokes 21 when they are used. The particular advantage gained by having these guide yokes 21 would be that they would prevent the main truck 4 from turning to such an angle as would take the weight of the load of the vehicle off of the auxiliary trucks and their supporting springs, which would occur if such trucks turned at a greater angle than that permitted by the limitation of such slotted yokes. This structure permits the band wheel truck to move in a circumferential manner to conform to the ground surface while the body 1 may remain in the same even plane at all times and still the yokes 21 and pins 22 and flanges 23 will take the side strain off of the main hub 3 and axle 2 in going around corners or the like if it is desired to use the same.

From the foregoing description it will readily appear that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A flexible band wheel truck comprising a main frame having an axle and auxiliary frame mounted on said axle and provided with a flexible band wheel, an auxiliary truck mounted on said auxiliary frame and bearing against said band wheel, slotted yokes on said auxiliary frame, pins on said main frame projecting into said slotted yokes and means for retaining said pins in said yokes, as described.

2. A flexible band wheel truck comprising a frame, a central hub on said frame, two wheels on said truck frame, a flexible band disposed on said wheels, an auxiliary truck secured centrally of said truck frame and comprising a lower frame, rollers on said frame and bearing against said band, an upper frame, rods on said lower frame movable through said upper frame and resilient means disposed between said lower and upper frames.

In testimony whereof I affix my signature in presence of two witnesses.

WALTER C. MATTESON.

Witnesses:
EDWARD G. MEINECKE,
C. C. McKAY.